US007740053B2

(12) United States Patent
Opdam et al.

(10) Patent No.: US 7,740,053 B2
(45) Date of Patent: Jun. 22, 2010

(54) METHOD OF COOLING OR HEATING A MEANS OF TRANSPORT AND A MEANS OF TRANSPORT

(75) Inventors: Joannes Jozef Gerardus Opdam, Amsterdam (NL); Anne-Sophie Van der Waart, The Hague (NL)

(73) Assignee: ECOFYS B.V., Utrecht (NL)

( * ) Notice: Subject to any disclaimer, the term of this patent is extended or adjusted under 35 U.S.C. 154(b) by 1559 days.

(21) Appl. No.: 10/894,449

(22) Filed: Jul. 16, 2004

(65) Prior Publication Data

US 2006/0169277 A1 Aug. 3, 2006

Related U.S. Application Data

(63) Continuation of application No. PCT/NL03/00026, filed on Jan. 16, 2003.

(30) Foreign Application Priority Data

Jan. 16, 2002 (NL) .................................... 1019756

(51) Int. Cl.
*B60H 1/00* (2006.01)
(52) U.S. Cl. .......................................... 165/41; 165/10
(58) Field of Classification Search .................. 165/10, 165/41, 122, 202
See application file for complete search history.

(56) References Cited

U.S. PATENT DOCUMENTS

| 2,541,169 | A |   | 2/1951  | Martin |  |
|-----------|---|---|---------|--------|--------|
| 3,236,056 | A | * | 2/1966  | Phillips et al. | ............... 165/202 |
| 3,773,031 | A |   | 11/1973 | Laing et al. |  |
| 3,885,126 | A | * | 5/1975  | Sugiyama et al. | ............ 165/122 |
| 4,976,308 | A | * | 12/1990 | Faghri | ........................... 165/10 |
| 5,246,061 | A | * | 9/1993  | Zalite | ............................ 165/10 |
| 5,398,747 | A | * | 3/1995  | Miaoulis | ........................ 165/41 |
| 5,871,041 | A | * | 2/1999  | Rafalovich et al. | ............. 165/10 |
| 6,059,016 | A | * | 5/2000  | Rafalovich et al. | ............. 165/41 |
| 7,147,071 | B2 | * | 12/2006 | Gering et al. | ................... 165/41 |
| 7,380,586 | B2 | * | 6/2008  | Gawthrop | .................... 165/202 |

FOREIGN PATENT DOCUMENTS

| DE | 197 35 584 A1 | 2/1999 |
| EM | 0 122 189 A1  | 10/1984 |
| EP | 0 663 426 A1  | 7/1995 |
| EP | 1 128 139 A1  | 8/2001 |
| FR | 2691237       | 11/1993 |
| GB | 2057109 A     | 3/1981 |
| GB | 2324852 A     | 11/1998 |

\* cited by examiner

*Primary Examiner*—Ljiljana (Lil) V Ciric
(74) *Attorney, Agent, or Firm*—Jeffrey D. Myers; Justin R. Jackson; Jacques van Breda

(57) ABSTRACT

A method of maintaining a space in a means of transport, such as a vehicle, at a desired temperature. The vehicle is provided with a storage tank containing a medium having a suitable temperature. According to the invention the storage tank is part of the transport means, the storage tank possesses an inlet opening for increasing the capacity for maintaining the space at the desired temperature, and is thus achieved; i) by feeding through the inlet opening a regenerating medium-comprising liquid and, after heat exchange between the regenerating medium and the medium, discharging the regenerating medium-comprising liquid; or ii) by via the inlet opening replacing the medium in the storage tank comprising liquid with medium-comprising liquid having a greater capacity of maintaining the space at the desired temperature.

10 Claims, 2 Drawing Sheets

METHOD OF COOLING OR HEATING A MEANS OF TRANSPORT AND A MEANS OF TRANSPORT

The present invention relates to a method of maintaining a space in a means of transport at a desired temperature ($T_D$) which means of transport is in an environment whose ambient temperature ($T_A$) is different to the desired temperature ($T_D$), wherein the means of transport possesses a storage tank containing a medium having a third temperature ($T_3$) which temperature is selected such that the desired temperature ($T_D$) lies between the third temperature ($T_3$), and the ambient temperature ($T_D$), that during transport heat exchange takes place between the storage tank and the space, for maintaining the space of the transport means at the desired temperature ($T_D$), during transport with the result of a medium having a reduced capacity for maintaining the space at the desired temperature ($T_D$), and when the means of transport stands still, the capacity for maintaining the space at the desired temperature ($T_D$) is increased with the aid of a device that does not form part of the means of transport.

Such a method is known from the British patent application 2,324,852. Here a mobile storage tank filled with a cold medium is placed in the load space of a lorry for maintaining it at a lowered temperature.

The drawback of this method is that placing the storage tank into the lorry is cumbersome. More in particular, it requires a forklift truck. The storage tank must be taken to the rear of the load space as it would otherwise hinder the loading and unloading of the goods to be transported.

It is the object of the present application to provide a method of the kind mentioned in the preamble, with which this problem is removed. The object is in particular to provide a method with which the desired temperature ($T_D$) can be adjusted during transport, and with which it is possible to increase the capacity for maintaining the desired temperature ($T_D$) quickly.

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 3:
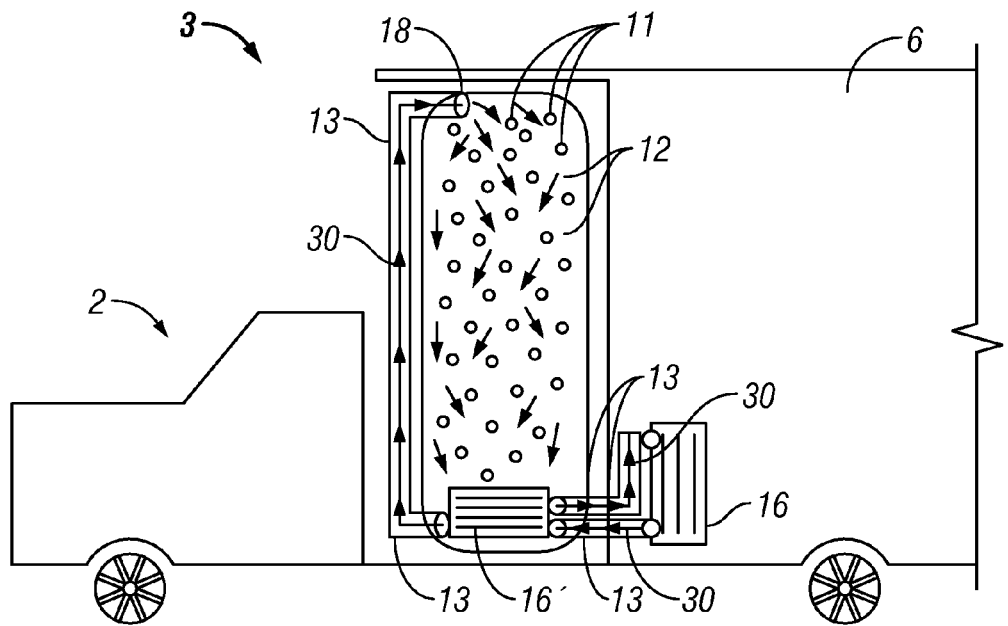
Figure 4:
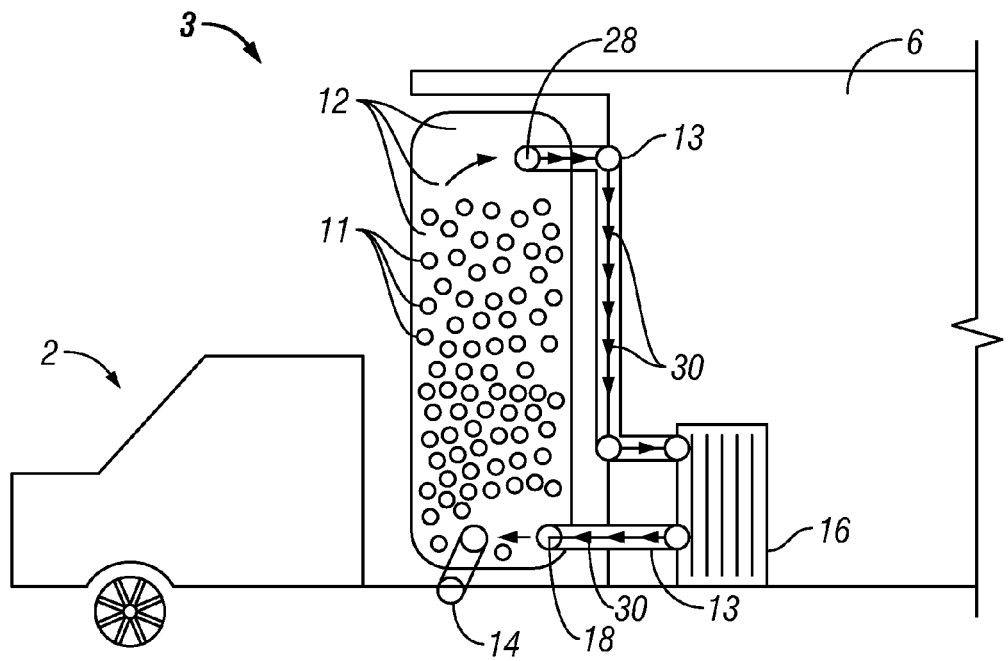

FIG. 3 shows an embodiment with the storage tank and inlet opening at the top, cooling/heat exchanging devices, circulating regenerating medium, and the means of transport with a space to maintain at the desired temperature; and FIG. 4 shows an embodiment with the storage tank and inlet opening at the bottom, a cooling/heat exchanging device, circulating regenerating medium, and the means of transport with a space to maintain at the desired temperature.

The method according to the invention is characterized in that the medium (12) in the storage tank (3) comprises solid elements (11) with which the storage tank (3) is filled, the solid elements (11) having a great capacity to maintain the space (6) at the desired temperature ($T_D$) and the storage tank (3) possessing an inlet opening (18) for increasing the capacity of maintaining the space (6) at the desired temperature, and that this is achieved by feeding through the inlet opening (18) a regenerating medium-comprising liquid (12) to surround the solid elements (11) and, after heat exchange between the regenerating medium (12) and the solid elements (11), discharging the regenerating medium-comprising liquid (12).

This is a simple manner of enabling a driver or driver's mate himself to increase the capacity of maintaining the desired temperature in the space (6), and of doing it in a relatively short time. The invention is especially suitable for cooling a load that needs to be kept cool. For some countries, such as the northern countries Sweden and Canada, the invention can also be advantageously used for keeping it at a sufficiently high temperature. This may apply to vegetables, fruit and other goods that must not freeze. This is in particular also possible during those moments in transport when the vehicle is standing still. When the term "during transport" is used in the present application, it refers to any moment a vehicle is travelling from A to B. Thus the vehicle may be in motion but may also be standing still. Compared with the known cooling devices provided on lorries, a considerable saving in fuel costs is realized. In addition, the emission of harmful substances such as soot particle is reduced. This is also of importance, for example, when delivering goods that must not spoil, such as dairy products. When a lorry is being unloaded, the cooling and consequently also the engine has to be kept running. This produces fume and noise nuisance for the people living in the neighborhood. The temperature is controllably adjustable and this occurs preferably automatically or by using one or several temperature sensors in the space (6). The transport means (2) is basically any transport means such as a lorry or semi-trailer/trailer, car, train or railway carriage, boat, etc.

In order to oust the present day diesel-based methods of cooling, a number of prerequisites must be fulfilled simultaneously. These are not fulfilled by the known prior art methods, whereas the method according to the present application does comply to a large extent. The phrase "the capacity to maintain the space at the desired temperature" as used in the present application is understood to mean the amount of thermal energy (in Joules) that can be absorbed or released. The means of transport may be a vehicle, vessel or aircraft, and preferably a vehicle for transporting persons, animals, plants or lifeless freight. The means of transport may also be a container (e.g. a sea container) of the kind that can be loaded onto a lorry or a ship.

The expression "solid elements having a great capacity to maintain the space at the desired temperature" means that per unit of volume the solid elements are able to absorb or release much energy. A typical value is at least 175 kJ/l such as at least 200 kJ/l, and preferably at least 225 kJ/l. Such an embodiment presents interesting possibilities. For example, the regenerating medium (12) could flow around the solid elements. This makes it very simple to increase the capacity of maintaining the space (6) at the desired temperature. This can also be done very quickly, which saves much time. In this respect the large surface area of the solid elements (11) is favorable. The regenerating medium (12) can be supplied very simply by means of tubes (13), similar to fuel supply, and heated regenerating medium (12) can simply be discharged via the same, but preferably via a special discharge opening (14). In contrast with EP 0,122,189 (discussed below), spheres that are frozen together are no longer a problem. In the framework of the present invention "solid element" means both a solid solid and a solid container containing a liquid. During operation, the liquid may or may not undergo a phase change. "Comprising solid elements" means "filled with solid elements" such as loose spheres, or provided with tubes etc. that may or may not be arranged in parallel. In the latter case, the tubes may be mounted in the interior of the storage tank, or they may be connected to one another to allow them to be removed from or placed into the storage tank as a unit.

GB-2057109 describes a method that uses a device comprising a storage tank and that is further provided with a primary circuit and a secondary circuit. For the regeneration of the eutectic mixture present in the storage tank, it is suggested to optionally do this at a service station. It is possible to use cold brine as regenerating medium. If the storage tank contains a solid medium, the heat exchange ratio is poor. If the storage tank contains liquid medium the thermal capacity in relation to volume and weight, is low. A storage tank having an inlet opening, i.e. an opening exiting into the lumen of the storage tank, is not described.

EP-0,122,189 describes a method in which a container mounted on a long is filled with frozen spheres. This filling is done quickly. However, as a result of the moisture given off by the freight (such as vegetables), or from the environment (when opening the load space), the spheres freeze together so that they cannot, or less easily, be removed from the space.

EP-1,218,139 describes a method in which a regeneration liquid medium is fed through a wall of a vehicle and due to the absorption of heat converts into gas. Such regeneration media require extra safety measures, in view of the danger for humans and the environment. The temperature cannot be adjusted during transport, and after opening the load space it is not possible to cool extra quickly in order to bring the space to the desired temperature as soon as possible. This is because the cold is stored in the walls that are in direct contact with the load space. After all, regeneration takes a relatively long time.

FR 2,691,237 discloses a method for maintaining a space of a means of transport at a desired temperature, using a storage tank. The storage tank contains a medium capable of storing cold. To regenerate the medium, a conduit is present in said storage tank through which a regenerating medium can be passed.

In the method according to the invention, basically any material that per unit of volume or weight has an attractively large capacity to retain heat or cold can be used. Such a material may be water, and in the case of temperatures below 0° C., mixtures of water and an agent lowering the freezing point, such as a salt or alcohol, more in particular eutectic mixtures.

A. preferred material to be used is a phase change material.

Such a material has a large capacity to absorb or release heat because the material undergoes a phase change. An additional advantage of such a material is that the moment the phase change takes place, its temperature changes only little or not at all. This makes it simpler to operate the device.

This method makes important improvements possible. For example, in accordance with a preferred embodiment at least 50% of the regenerating liquid medium (12) surrounding the solid elements (11) is removed from the storage tank (3) and the remaining medium is used for maintaining the space (6) at the desired temperature.

An important advantage of this is that less weight has to be transported. Preferably at least 75% and still more preferably at least 90% is removed from the tank. Said percentages relate to the so-called "void volume", that is to say the empty space between the solid elements. Another advantage is that the liquid surrounding the liquid elements does not mix, so that the available thermal capacity can be used more efficiently.

Figure 1:
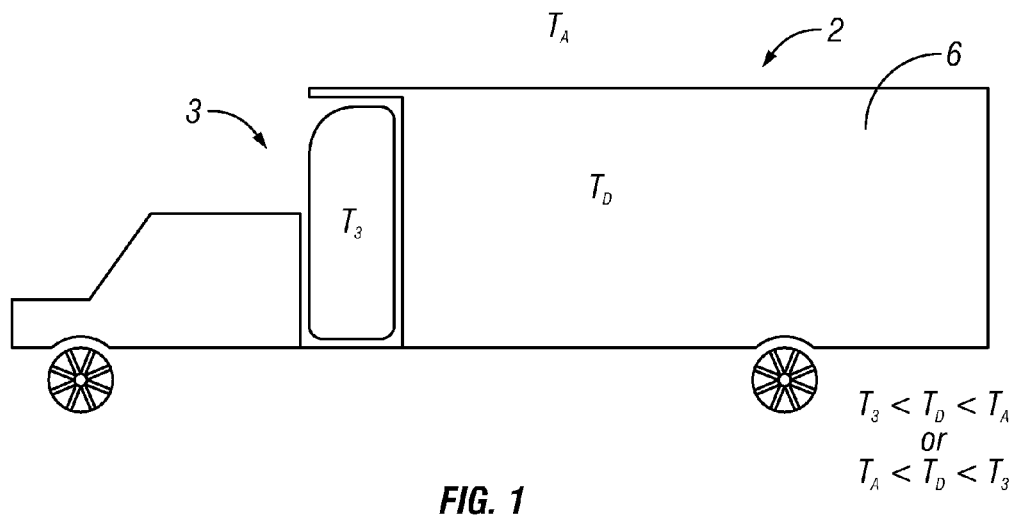
FIG. 1 shows the temperature variants with the means of transport and storage tank.
Figure 2:
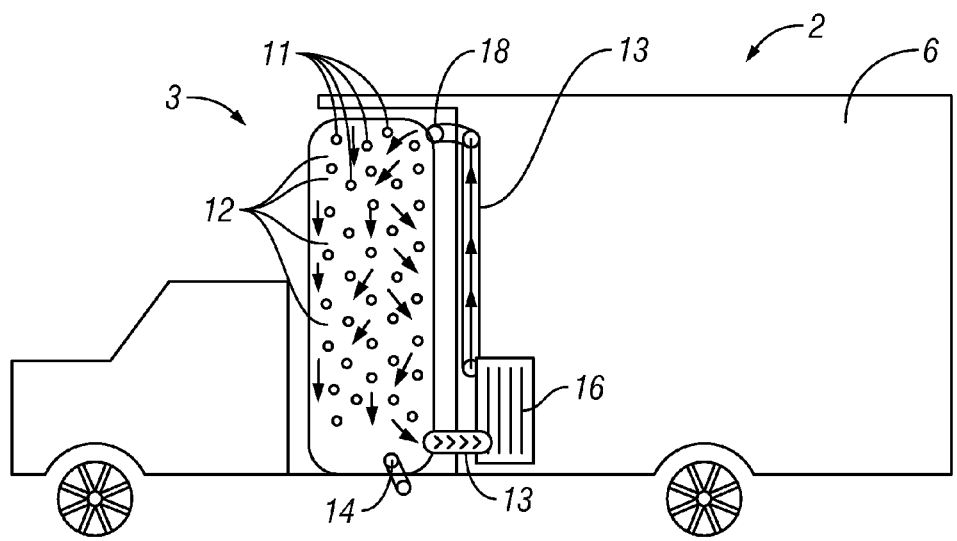
FIG. 2 shows an embodiment with the storage tank having an inlet opening at the top, circulating regenerating medium, and the means of transport with a space to maintain at the desired temperature.

According to a first variant (FIG. 2), the remaining liquid medium (12) is used as medium for maintaining the space (6) at the desired temperature by circulating it in a heat exchanging relationship with that space, wherein the medium (12) after exchanging heat with the space (6) is introduced into the storage tank (3) at the top and allowed to flow downward along the solid elements (11).

In this way the temperature of the medium (12) for maintaining the space (6) at the desired temperature (by conducting the medium (12) around in a heat-exchanging relationship with the space (6) prevailing in the bottom of the storage tank (3) stays substantially the same. This is because during operation the solid elements (11) in the bottom of the device retain their heat exchanging ability for a longer period of time. This simplifies the control technology and limits the peak pumping capacity required for circulating the medium (12). This reduces the capital outlay and operating costs. Furthermore, the thermal capacity in the storage tank (3) can be utilized almost completely.

According to a second variant (FIG. 3) a further medium (30) is used as medium by circulating it in the space (6) in a heat exchanging relationship with that space, with the remaining liquid medium (12) being pumped from the bottom of the storage tank (3) upward in order to be brought in contact with the solid elements (11) in the top of the storage tank (3), and the further medium (30) after heat exchange with the space at the bottom of the storage tank (3) is brought into a heat-exchanging relationship with the liquid medium (12) that flowed downward over the solid elements.

The further medium (30) (FIG. 3) that is being circulated for maintaining the space (6) at the desired temperature may very well have a different composition than the liquid medium (12) in the storage tank (3). Such a difference in composition may be desirable with a view to safety (flammability, toxicity) or for reasons relating to thermal technology (for example, to increase the regeneration speed).

To both variants applies that between the liquid medium (12) in the storage tank (3) and the solid elements (11) an excellent heat exchange is possible. The liquid medium (12) applied on the solid elements (11) may be sprayed on, which further improves the heat exchange between the solid elements (11) and the liquid medium (12).

According to a second important embodiment the liquid-comprising medium (12) in the storage tank (3) is replaced, and the liquid-comprising medium (12) contains solid elements.

Just as with the other embodiments, the solid elements (11) such as spheres, are preferably elements comprising a Phase Change Material. In this way it is simple to replace phase-change material in the storage tank (3) with similar material having a greater capacity for maintaining the space (6) at the desired temperature. The problem of EP 0,122,189, that spheres freeze together is completely avoided, since the spheres are carried by the liquid and do not come in direct contact with air from a space to be cooled.

The replacement of medium (12) in the storage tank (3) for regeneration is not disclosed in GB-2057109. When in relation to a medium the present application refers to "liquid-comprising", this is understood to be a pumpable liquid even if the same comprises a solid phase. The solid phase is then carried by the liquid. The solid phase may have a defined shape, such as spheres, or an undefined shape as will be explained later in this application. When solid elements (11) of a defined shape are present, they are usually elements comprised of a different material than the medium (12) surrounding the elements. The elements may, for example, be plastic elements filled with a phase change material. With the method according to the invention it is possible to pass the liquid in the tank (12), optionally together with solid elements (11) that may be present, along a heat-exchanging surface in order to adjust to the desired temperature (FIG. 4). The heat-exchanging surface may be an interior wall of the space (6).

Between the device for increasing the capacity of maintaining the space at a desired temperature and the transport means preferably a buffer vat is provided.

This makes it possible to use a continuously operating device that is not part of the transport means. This allows the capacity of the device to be reduced, which lowers the capital outlay. Alternatively, electricity may be used at moments when it is cheap.

According to an interesting embodiment, the transport means is an electric vehicle and the space being heated is the space for the passengers.

Combustion engines are relatively inefficient and produce much heat. In cold conditions, this heat may be used, for example, for keeping the space for the passengers warm. The efficiency of electro-motors is so high, that heating electric vehicles is a problem. Electric heating very much restricts the range of action. The method according to the invention allows an electric car to be heated very effectively and with little extra weight.

According to a very important application, the space (6) to be cooled is a space wherein the transport means possesses a storage tank (3) containing a medium (12) with a low temperature, cold is withdrawn from the medium (12) in order to maintain the space (6) of the transport means (2) at a desired temperature during transport which results in a medium (12) having a reduced cooling capacity, and during standstill of the transport means the cooling capacity is increased with the aid of a cooling device (16) which is not part of the transport means, the storage tank (3) is part of the transport means, the storage tank (3) possesses an inlet opening (18) for increasing the cooling capacity, and the cooling capacity is increased by i) feeding a cooling medium (12) through the inlet opening (18) and discharging heated cooling medium (12), with the cooling medium (12) having a lower temperature than the medium fig) in the storage tank (3); or ii) the medium (12) in the storage tank (3) is replaced via the inlet opening (18) with medium (12) having a greater cooling capacity.

In order to increase the cooling capacity in the simplest possible manner, the medium (12) is preferably a slurry comprised of ice and an agent lowering the freezing point.

Such a slurry can be made quite simply by means of a suitable device such as a scraped surface heat exchanger of a refrigerating machine (16). The slurry can be pumped in a simple manner into the storage tank (3) and after the absorption of heat be replaced again.

In order to avoid the exchange of thermal energy with the environment, the inlet opening (18) is preferably provided outside the space (6) and the capacity of maintaining the space (6) at the desired temperature is improved without opening the space (6).

The invention also relates to a transport means having a space that can be cooled by using a storage tank (3) in which a medium (12) can be contained and means are present for conducting the cold to the space (6).

The transport means (2) according to the invention possesses a storage tank (3) which is connected therewith having an inlet opening (18), said storage tank (3) being filled with solid elements (11) and the inlet opening (18) allowing a regenerating medium-comprising liquid (12) to surround the solid elements.

Via the inlet opening (18) a (regenerating) medium (12) can be introduced into the lumen of the storage tank (3). The inlet opening (18) is preferably near the bottom of the storage tank (3). The storage tank (3) preferably also has an outlet opening (28) for used (regenerating) medium (12), which outlet opening (28)—in the case of regenerating by means of through-flow—is preferably located in the top of the storage tank (3).

GB-2,324,852 discloses a device having a mobile storage tank that has to be replaced each time the cooling capacity has to adjusted. The disadvantage of this device is that the entry to the load space has to be opened. If freight is already present, cooling capacity is lost. In addition, the cooling capacity can not or only with difficulty be increased when freight is already present in the load space.

The invention therefore preferably provides a transport means (2) having an inlet opening (18) is accessible for increasing the capacity of maintaining the space (6) at a desired temperature without opening the space (6) be cooled.

The invention also relates to an electric vehicle having a heat able space wherein the vehicle possesses a storage tank (3) connected therewith, said storage tank (3) being filled with solid elements (11) and said storage tank (3) having an inlet opening (18) allowing a regenerating medium-comprising liquid (12) to surround the solid elements, and means (16) are present for conducting heat to the space (6).

The electric vehicle preferably possesses a storage tank (3) having an inlet opening (18) that is accessible for increasing the capacity of maintaining the space (6) at the desired temperature without opening the space (6) to be heated.

For the distribution of air in the space (6), as well as for the absorption from the space (6) of air to be cooled or heated, it is advantageous to use a porous or perforated (plastic) tube, which tube has, for example, a round or rectangular cross-section. Alternatively, at least part of the wall may be provided with such a permeable film or cloth. After heat exchange with the storage tank (3), air is introduced into the tube or behind the film or the cloth and via the opening(s) or via the film or cloth enters the space (6), for maintaining the same at a desired temperature.

What is claimed is:

1. A method of maintaining a space in a means of transport at a desired temperature, which means of transport is in an environment whose ambient temperature is different from the desired temperature and possesses a storage tank containing a medium having a third temperature, the method comprising the steps of:

selecting the third temperature such that the desired temperature lies between the third temperature and the ambient temperature;

during transport allowing heat exchange to take place between the storage tank and the space to maintain the space of the transport means at the desired temperature during transport causing a medium in the storage tank to have a reduced capacity for maintaining the space at the desired temperature; and when the means of transport stands still, increasing the capacity for maintaining the space at the desired temperature with the aid of a device that does not form part of the means of transport;

wherein the medium in the storage tank comprises solid elements with which the storage tank is filled, the solid elements having capacity to maintain the space at the desired temperature, and wherein the storage tank possesses an inlet opening for increasing the capacity of maintaining the space at the desired temperature, and wherein this is achieved by feeding through the inlet opening a regenerating medium-comprising liquid to surround the solid elements and, after heat exchange between regenerating medium and the solid elements, discharging regenerating medium-comprising liquid.

2. A method according to claim 1, wherein as the medium a phase change material is used.

3. A method according to claim 1, wherein at least 50% of the regenerating liquid medium surrounding the solid elements is removed from the storage tank and the remaining medium is used for maintaining the space at the desired temperature.

4. A method according to claim 3, wherein the remaining liquid medium is used as medium for maintaining the space at the desired temperature by circulating it in a heat exchanging relationship with that space, wherein the medium after exchanging heat with the space is introduced into the storage tank at the top and allowed to flow downward along the solid elements.

5. A method according to claim 3, wherein a further medium is used as medium by circulating it in the space in a heat-exchanging relationship with that space, with the remaining liquid medium being pumped from the bottom of the storage tank upward in order to be brought in contact with the solid elements in the top of the storage tank, and the further medium after heat exchange with the space at the bottom of the storage tank is brought into a heat-exchanging relationship with the liquid medium that flowed downward over the solid elements.

6. A method according to claim 1, wherein between the device for increasing the capacity of maintaining the space at a desired temperature and the transport means a buffer vat is provided.

7. A method according to claim 1, wherein the transport means is an electric vehicle and the space being heated is the space for the passengers.

8. A method according to claim 1, wherein the space is a space to be cooled, the transport means possesses a storage tank containing a medium with a low temperature, cold is withdrawn from the medium in order to maintain the space of the transport means at a desired temperature during transport which results in a medium having a reduced cooling capacity, and during standstill of the transport means the cooling capacity is increased with the aid of a cooling device, which is not part of the transport means, the storage tank is part of the transport means, the storage tank possesses an inlet opening for increasing the cooling capacity, and the cooling capacity is increased by i) feeding a cooling medium through the inlet opening and discharging heated cooling medium, with the cooling medium having a lower temperature than the medium in the storage tank; or ii) the medium in the storage tank is replaced via the inlet opening with medium having a greater cooling capacity.

9. A method according to claim 8, wherein the medium is a slurry comprised of ice and an agent lowering the freezing point.

10. A method according to claim 1, wherein the inlet opening is provided outside the space and the capacity of maintaining the space at the desired temperature is improved without opening the space.

* * * * *